United States Patent [19]

Stansfield et al.

[11] Patent Number: 4,879,594
[45] Date of Patent: Nov. 7, 1989

[54] REPRODUCTION OF COLORED IMAGES

[75] Inventors: Peter W. Stansfield, Hertfordshire; Alastair Reed, Bedfordshire, both of England

[73] Assignee: Crosfield Electronics Limited, London, England

[21] Appl. No.: 248,072

[22] Filed: Sep. 23, 1988

[30] Foreign Application Priority Data

Sep. 23, 1987 [GB] United Kingdom ............... 8722406

[51] Int. Cl.⁴ .............................................. H04N 1/46
[52] U.S. Cl. ....................................... 358/80; 358/75; 358/78
[58] Field of Search ....................... 358/75, 80, 76, 78

[56] References Cited

U.S. PATENT DOCUMENTS

| | | | |
|---|---|---|---|
| 3,590,142 | 6/1971 | Keller | 358/80 |
| 3,629,490 | 12/1971 | Keller | 358/80 |
| 4,477,833 | 10/1984 | Clark et al. | 358/80 |
| 4,488,245 | 12/1984 | Dalke et al. | 358/80 |
| 4,511,989 | 4/1985 | Sakamoto | 358/75 |
| 4,613,897 | 9/1986 | Stansfield | 358/80 |
| 4,751,535 | 6/1988 | Myers | 358/80 |

FOREIGN PATENT DOCUMENTS 0209266 1/1987 United Kingdom .

Primary Examiner—Edward L. Coles, Sr.
Assistant Examiner—Kim Yen
Attorney, Agent, or Firm—Sughrue, Mion, Zinn, Macpeak and Seas

[57] ABSTRACT

A method and apparatus for reproducing a colored original image represented by first signals defining the color content of pixels of the original image in terms of a first set of color components. The colored original image is reproduced using at least two separations representing respective color components of a second set which is different from the first set. The color components of the second set are ranked in order of similarity to each pixel and a value is selected for the highest ranked color component for which each of the first set of color component values defining said selected color component does not exceed the corresponding pixel values. The pixel values are then adjusted to take account of the select value of the color component of the second set. The process is then repeated for each of the remaining color components of the second set in the order of ranking.

9 Claims, 3 Drawing Sheets

REPRODUCTION OF COLORED IMAGES

FIELD OF THE INVENTION

The invention relates to methods and apparatus for reproducing colored images.

DESCRIPTION OF THE PRIOR ART

Colour printing is normally carried out by making a set of individual black and white colour separation transparencies, each having density values corresponding to the values in the original of the colour component which the separation represents. It is customary to produce colour separations from the red, green and blue components and to use these to make colour printers which are used to print images in cyan, magenta and yellow respectively, these colours being complementary to the red, blue and green of the filters. Colour correction is carried out before the colour printers are produced to compensate for various process non-linearities and also for the fact that the cyan, magenta and yellow printer inks are not exactly complementary in colour to the red, green and blue filters.

It is sometimes required, in the printing of the final image, to include one or more inks of different colours (non-process inks) from the colour components used to represent pixels of the original image. An example of such a special colour is brown.

In EP-A-0184289 we describe a method and apparatus for producing a colour separation for a colour component other than those used to define an original image. When this process is extended to the extraction of two or more special colours from an image, the same special colour is always extracted first up to a certain limit followed by the next colour.

In certain circumstances, this can suffer from certain drawbacks. For example, with a CMY image with a predominantly red area, if brown was extracted first, then brown would be extracted from the green areas also leaving a large residual CMY. Similarly if green (another special colour) was extracted first, then green would be extracted from brown areas leaving a large residual CMY.

SUMMARY OF THE INVENTION

In accordance with one aspect of the present invention a method of reproducing a coloured original image represented by first signals, defining the colour content of pixels of the original image in terms of a first set of colour components, in which at least two separations are prepared representing respective colour components of a second set different from the first set comprises for each pixel of the original image
(i) ranking the colour components of the second set in order of similarity to the pixel;
(ii) selecting a value for the highest ranked colour component for which each of the first set of colour component values defining said selected colour component does not exceed the corresponding pixel values;
(iii) adjusting the pixel values to take account of the selected value of the colour component of the second set; and,
(iv) repeating steps (ii) and (iii) for each of the remaining colour components of the second set in the order of ranking.

In accordance with a second aspect of the present invention apparatus for reproducing a coloured original image represented by first signals defining the colour content of pixels of the original image in terms of a first set of colour components, the coloured original image being reproduced using at least two separations representing respective colour components of a second set different from the first set comprises means for ranking the colour components of the second set in order of similarity to each pixel; means responsive to the values of each pixel to select a value for the ranked colour components in turn for which each of the first set of colour component values defining the corresponding ranked colour component does not exceed the corresponding pixel values; and means for adjusting the pixel values to take account of the selected value of the colour component of the second set.

With this invention, a much more flexible system is proposed in which the colour component of the second set which is removed first from a pixel is selected in accordance with its similarity with the pixel. Thus, in the example given above, where the special colours concerned are brown and green, the brown component would be removed or extracted first in brown areas and the green component in green areas.

Further advantages of the method are that it minimizes the inks required, which results in cost savings, while better image quality is obtained since the ink used will be better matched to the colour being reproduced than hitherto.

Typically, the first set of colour components will comprise cyan, magenta, and yellow and possibly also black.

The method may further comprise an initial step of storing values defining at least the characteristic elements of curves which respectively represent the colour components of the second set in terms of colour component values of the first set.

There is a large variety of ways in which the similarity between a pixel colour and the special colours could be determined. In one simple example, a decision tree may be generated based on the relative proportions of the different colour components of the first set in each pixel.

In a more sophisticated arrangement where there are two colour components in the second set, step (ii) may comprise determining the proportions of each colour component of the second set to extract from the pixel values by constructing a triangle in colour space whose apices are defined by respectively the pixel colour and the closest matches of the two colour components of the second set to the pixel colour, the proportions being defined by the lengths of the portions of a line joining the apices defined by the colour components of the second set divided by a perpendicular dropped from the other apex.

The closest match of each component of this may be achieved by determining the composition of the colour component which, when extracted from the original pixel colour, causes one of the pixel colour components to fall to zero.

The ranking of the colours may be achieved by comparing the distances in colour space to the pixel position of each special colour component. Ideally the ranking should be done in a uniform perceptual colour space in which equal distances correspond to an equal perceptual change.

In some cases, it may be desirable after extracting the second colours to determine to which second colour the residual pixel colour is most similar, and extracting that second colour until a pixel colour component is zero.

BRIEF DESCRIPTION OF DRAWINGS

In order that the invention may be better understood, some examples of methods and apparatus according to the invention will now be described with reference to the accompanying drawings, in which.

DETAILED DESCRIPTION OF THE EMBODIMENTS

Figure 1:
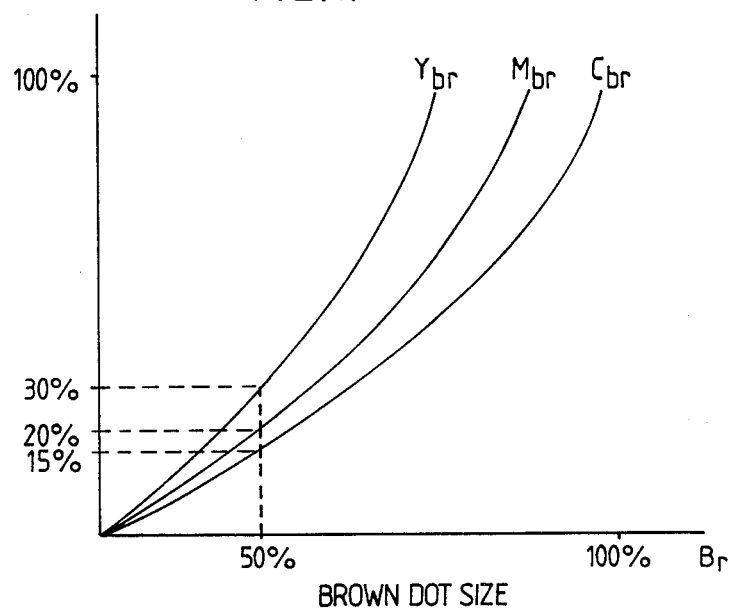
FIG. 1 shows curves of yellow, magenta, and cyan values corresponding to different values of a special colour separation.

The special colour shown in FIG. 1 is a brown which, for a 50% brown dot size, is defined by 30% yellow, 20% magenta, and 15% cyan. As shown by the curves, these percentage values are not maintained throughout the range of brown dot sizes (0–100%). The reason for this is that inks are not simply additive, colour intensity varies non-linearly with ink thickness and dot percentage is not linear with density.

Values representing the curves shown in FIG. 1 (or at least characteristic elements of these curves) are stored for each special colour for comparison with the yellow, magenta and cyan values obtained for each pixel of the coloured image to be reproduced.

Figure 2:
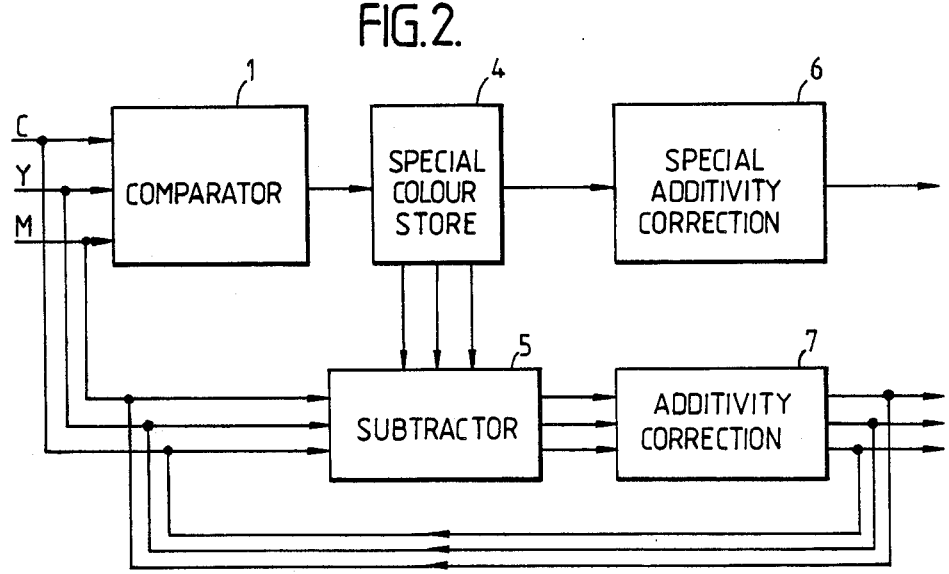
FIG. 2 is a block diagram of one example of apparatus for carrying out the invention.

One example of the method and apparatus will now be described with reference to FIGS. 2 and 3. Consider an original image pixel having values C:90%, M:70%, and Y:30%. It is assumed that the special colours are green and red respectively. Initially signals representing the colour component values of the pixel are fed to a comparator 1 which compares the colour component values of the incoming pixel to determine the component with the highest value. In this example, the component is cyan. In accordance with the decision tree of FIG. 3, this guides the decision along an arm 2 of the tree. The next highest colour component is determined which, in this case, is magenta and in accordance with the decision tree, this guides the decision along a subsidiary arm 3. Thus the decision tree indicates that in this example 100% of special colour 1 (green) may be extracted and 0% of special colour 2 (red). This decision is passed from the comparator to a special colour store 4 in which curves similar to those in FIG. 1 are contained. Typically, the store 4 may be in the form of a look-up table which is addressed by the signal from the comparator 1. Cyan, magenta and yellow values corresponding to 100% of special colour 1 are fed to a subtractor circuit 5 which then subtracts these values from the original pixel values which are also fed to the subtractor 5. In addition, a special colour signal is fed to a special colour additivity correction circuit 6.

The residual colour component values of the pixel are fed to an additivity correction circuit 7 which corrects these values in a conventional manner and then the values are fed back to the subtractor circuit 5 to enable a further special colour separation to be generated corresponding to special colour 2. Of course, in the present example, since the decision tree indicated that 0% of special colour 2 was appropriate, no further change occurs and the original output signals from the additivity correction circuit 7 will constitute the final colour component values.

The signals from the correction circuits 6,7 can then be used to control an exposing laser beam in a conventional way to generate the colour separations.

Although in the present example the original pixel is represented by just three colour components, in other examples the pixel content may be represented by four colour components: cyan, magenta, yellow and black.

If the decision tree led to one of the intermediate combinations such as 75% special colour 1 and 25% special colour 2 then the comparator 1 would address a different portion of the special colour store 4 in order to extract colour component values corresponding to 75% special colour 1 and up to 25% special colour 2 in turn.

Figure 3:
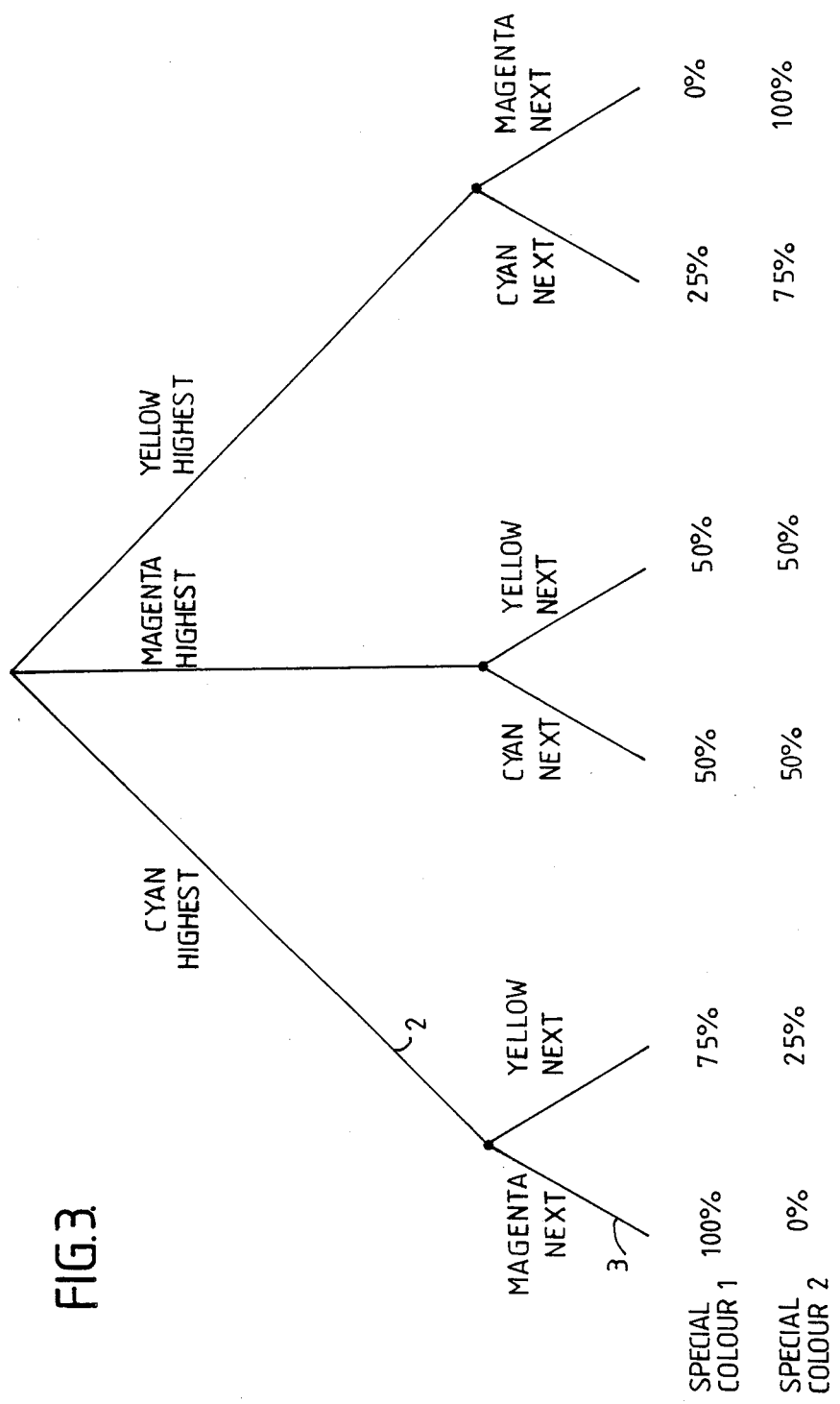
FIG. 3 illustrates a decision tree for use by the apparatus shown in FIG. 2.
Figure 4:
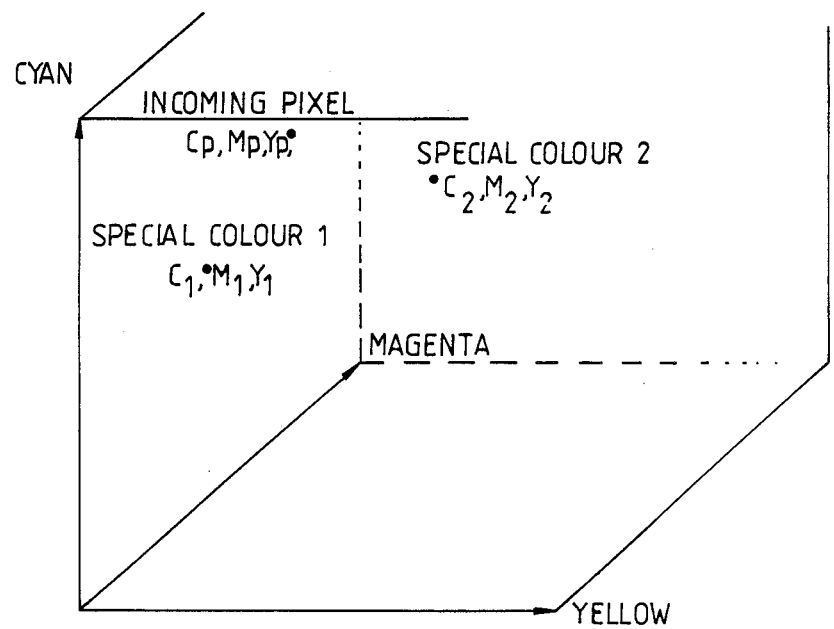
FIG. 4 illustrates a colour cube.

The method described in connection with FIG. 3 provides a relatively coarse selection for the colour components. An alternative method for determining the proportions of each special colour to use will now be described with reference to FIGS. 4 and 5. FIG. 4 illustrates a colour cube whose axes correspond to the percentages of cyan, magenta, and yellow respectively. Other conventional forms of colour cube could also be used, for example a colour cube where the axes represent luminance, saturation and hue.

In this method the location of the closest or exact match of special colour 1, defined by a point with coordinates $C_1$, $M_1$, $Y_1$, and special colour 2 defined by a point having coordinates $C_2$, $M_2$, $Y_2$, is determined. This is achieved by successively extracting equal increments of special colour 1 (0%, 1% etc) in terms of the cyan, magenta and yellow components from the pixel colour, until a first one of the pixel colour components falls to zero. The cyan, magenta and yellow values of that form of the special colour 1 then define the point $C_1$, $M_1$, $Y_1$ This process is repeated to determine the point $C_2$, $M_2$, $Y_2$.

Figure 5:
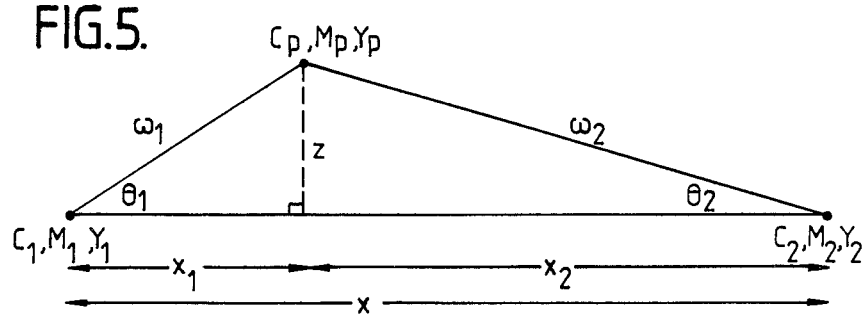
FIG. 5 illustrates an alternative method for determining the proportions of special colours to be used.

The incoming pixel is represented by a point having coordinates $C_p$, $M_p$, $Y_p$. A plane is then constructed in colour space which passes through these three points which define a triangle with sides x, $w_1$, $w_2$ (FIG. 5).

A perpendicular is dropped from the pixel point to the line joining the two special colour points and then the lengths of the two sections of the line with length x are then determined ($x_1$, $x_2$) using Pythagoras theorem. This gives:

$$x_1 = (w_2^2 - x^2 - w_1^2)/2x$$

$$x_2 = (x^2 + w_2^2 - w_1^2)/2x$$

The proportions ($P_1$, $P_2$) of special colour 1 and special colour 2 to extract are then given by $$P_1 = x_2/(x_1 + x_2)$$

$$P_2 = x_1/(x_1 + x_2)$$

Consider the following example in which the original pixel components and exact matches of the special colours have the following values as set out in Table 1 below.

TABLE 1

|  | C | M | Y | % Special Colour |
|---|---|---|---|---|
| Special Colour 1 | 25 | 28 | 20 | 34 |

TABLE 1-continued

|  | C | M | Y | % Special Colour |
|---|---|---|---|---|
| Special Colour 2 | 0 | 18 | 70 | 56 |
| Pixel | 25 | 70 | 70 | |

In this example, special colour 1 represents a dark brown, special colour 2 a warm yellow, and the pixel is a brownish-red.

The values of x, $w_1$, $w_2$ are determined using the formulae above which, in this example, yield:

$$x_1 = 36.6$$

$$x_2 = 20.2$$

$$p_1 = 0.355$$

$$p_2 = 0.645$$

Since $P_2 > P_1$, special colour 2 should be extracted first, up to a value determined by the exact match percentage (56%) multiplied by the proportion of special colour 2 to be extracted i.e, $56 \times 0.645 = 36\%$. This corresponds to cyan, magenta and yellow components to be extracted of C:0%, M:11%, Y:40%.

After extraction (and ignoring non-linear effects), this leaves residual pixel colour components of C:25%, M:59%, Y:30% which is then extracted into special colour 1.

Having extracted the two special colours, it may be that two of the process colour components of the residual pixel colour are non-zero. In general the smaller of these quantities can be ignored leading to the generation of three colour separations corresponding to the two special colours and the remaining process colour.

We claim:

1. A method of reproducing a coloured original image represented by first signals, defining the colour content of pixels of said original image in terms of a first set of colour components, in which at least two separations are prepared representing respective colour components of a second set different from said first set comprises for each pixel of said original image
   (i) ranking said colour components of said second set in order of similarity to said pixel;
   (ii) selecting a value for the highest ranked colour component for which each of said first set of colour component values defining said selected colour component does not exceed the corresponding pixel values;
   (iii) adjusting said pixel values to take account of the selected value of said colour component of said second set; and,
   (iv) repeating steps (ii) and (iii) for each of the remaining colour components of said second set in the order of ranking.

2. A method according to claim 1, further comprising an initial step of storing values defining at least the characteristic elements of curves which respectively represent said colour components of said second set in terms of colour component values of said first set.

3. A method according to claim 1, in which there are two colour components in said second set, step (ii) comprising determining the proportions of each colour component of said second set to extract from said pixel values by constructing a triangle in colour space whose apices are defined by respectively said pixel colour and the closest matches of said two colour components of said second set to said pixel colour, said proportions being defined by the lengths of the portions of a line (X) joining said apices defined by said colour components of said second set divided by a perpendicular (Z) dropped from the other apex.

4. A method according to claim 3, wherein the closest match of each component is achieved by determining the composition of said colour component which, when extracted from said original pixel colour, causes one of said pixel colour components to fall to zero.

5. A method according to any of the preceding claims, wherein said ranking of said colours is achieved by comparing said distances in colour space to said pixel position of each special colour component.

6. A method according to claim 1, further comprising after extracting said second colours, determining to which second colour the residual pixel colour is most similar, and extracting that second colour until a pixel colour component is zero.

7. Apparatus for reproducing a coloured original image represented by first signals defining the colour content of pixels of said original image in terms of a first set of colour components, said coloured original image being reproduced using at least two separations representing respective colour components of a second set different from said first set, the apparatus comprising means for ranking said colour components of said second set in order of similarity to each pixel; means responsive to the values of each pixel to select a value for said ranked colour components in turn for which each of said first set of colour component values defining the corresponding ranked colour component does not exceed the corresponding pixel values; and means for adjusting said pixel values to take account of said selected value of said colour component of said second set.

8. Apparatus according to claim 7, further comprising means for storing values defining at least the characteristic elements of curves which respectively represent said colour components of said second set in terms of colour components values of said first set.

9. Apparatus according to claim 7, in which there are two colour components in said second set, wherein said means responsive to said values of each pixel comprises means to determine the proportions of each colour component of said second set to extract from said pixel values by constructing a triangle in colour space whose apices are defined by respectively said pixel colour and the closest matches of said two colour components of said second set to said pixel colour, said proportions defined by the lengths of the portions of a line joining said apices defined by said colour components of said second set divided by a perpendicular dropped from the other apex.

* * * * *